Nov. 9, 1965 H. W. GRIMM 3,216,184
SICKLE BAR OUTER SHOE

Filed March 5, 1964 2 Sheets-Sheet 1

INVENTOR.
HAROLD W. GRIMM
BY
ATTORNEY

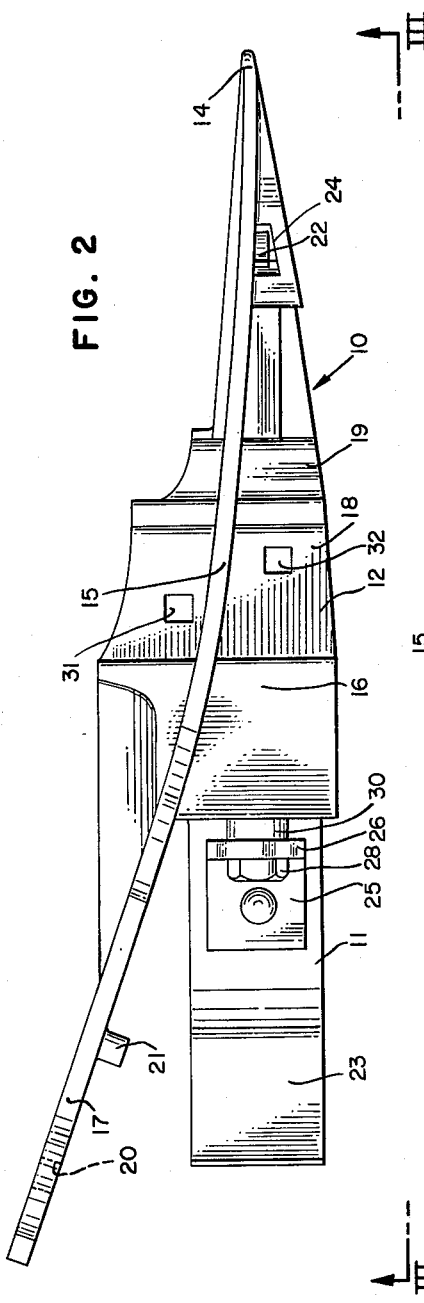
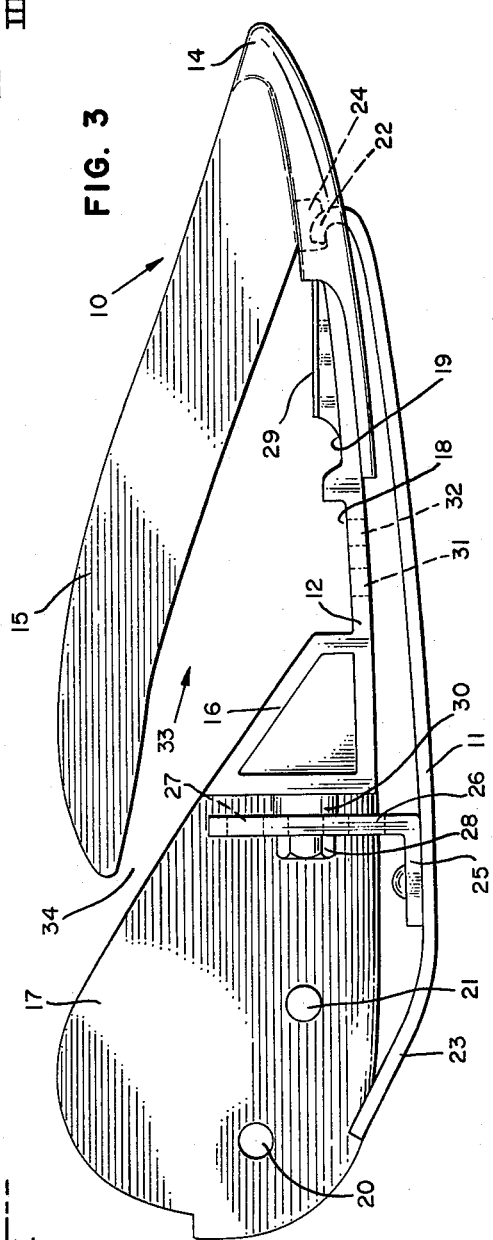

3,216,184
SICKLE BAR OUTER SHOE
Harold W. Grimm, P.O. Box 1410, Rte. 1, Lathrop, Calif.
Filed Mar. 5, 1964, Ser. No. 349,597
3 Claims. (Cl. 56—314)

This invention relates to sickle bars for mowing machines, and in particular to the sickle bar outer shoe which guides the hay, grain, grass and the like at the outer limit, into the sickle bar for cutting, guiding the cuttings away from the marginal edge of the uncut portion, and making a clean line of demarcation between the cut and uncut field.

This invention provides a sickle bar outer shoe having an inwardly curved guide blade, the eye of which is free from clogging or jamming by stalks of the crop being mowed, or by other vegetable matter. This is accomplished by opening the eye rearwardly and upwardly so that the eye is open completely through the guide blade, and narrowing the opening from the eye. The resulting forward and rearward portions of the guide blade are separately but integrally mounted on a shoe frame to retain the inward curvature. Any hay, grass, grain and the like which may be entrapped in the eye, slides out through the narrow rearward slit or opening and is released by the presence of the constant fresh cuttings back against the grass board which distributes the cuttings along the margin of the row being cut.

A particular advantage of the present invention is that it eliminates the problem of the cuttings wadding up in the eye of the outer shoe until it knocks the grain down at the outer end so it is not cut by the sickle bar.

Most outer shoes, which are old in the mowing art, comprise an inwardly curved metal plate with a central opening or closed eye located at the forward portion where it attaches to the sickle bar. In the present outer shoe cuttings cannot accumulate in the eye because the eye is being continuously cleared through the rearward narrow opening by the constant contact first with uncut and then cut grain and the like.

Another advantage of the invention is that it saves the time of the operator of the mowing machine and the wear and expense of stopping and starting the motor of the mechanized equipment. Up to this time, when the eye of the outer shoe becomes clogged or jammed, the operator must stop the mower, place the motor in neutral, dismount and work the cuttings free of the eye. This may take five minutes or more, depending upon how tightly the material is caught and the nature of the crop being cut. This may appear a small matter individually, but when it is multiplied four or five times per acre cut, on an average, then the total losses are meaningful.

A significant advantage is that the outer shoe of the invention may be used to replace those used presently and those on old mowers without any alteration or adjustment of any other part of the mower. The same type of connecting and supplemental units are used as on other outer shoes, and they fit in the same way.

Accordingly, an object of the invention is to provide an outer shoe for a sickle bar on a mowing machine which permits the continuous operation thereof without stopping to clear the eye of the shoe.

Another object of the invention is to provide an outer shoe in which the problem of cuttings accumulating in the eye thereof is eliminated automatically and continuously.

Another object of the invention is to provide an outer shoe with an open eye for constantly closing and guiding the cuttings which ordinarily would accumulate in the eye, back with the normal cuttings.

Another object of the invention is to provide an outer shoe which eliminate time losses due to the necessity of cleaning the accumulation of cuttings from the eye thereof.

A further object of the invention is to provide an outer shoe for a mowing machine sickle bar in which the eye thereof is open rearwardly and completely through the guide blade.

Another object is to provide such an open eye outer shoe which is completely interchangeable with the outer shoes of the prior art and which uses the same fittings for the sickle bar and the grass board are used in connection with the outer shoes of the prior art.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

Referring to the drawings:

FIGURE 2 is a top plan view of the outer shoe for a mower sickle bar of the invention; and FIGURE 3 is a side elevational view of the sickle bar outer shoe of the invention, looking in the direction of the arrows III—III of FIGURE 2.

Figure 1:
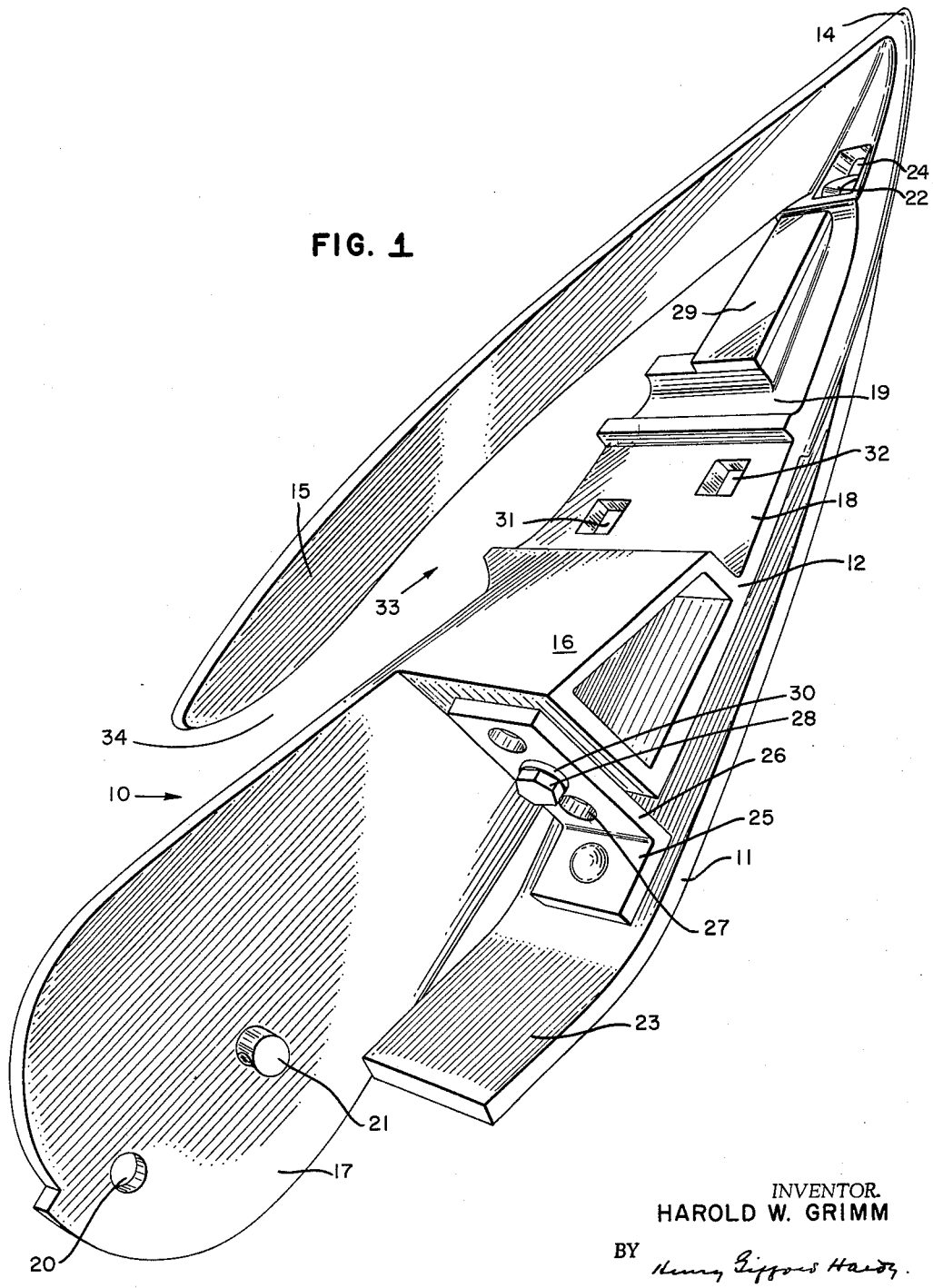
FIGURE 1 is a perspective veiw of the sickle bar outer shoe of the invention looking from the outside.

Referring now to the figures in the drawings in which like numerals indicate like parts in the several views, there is shown an outer shoe 10 for use on a conventional mowing machine sickle bar (not shown), the outer shoe 10 having a removable sole 11 which is mounted on a formed frame 12 which generally represents the horizontal plane. The forward end of the frame 12 comes to a relatively sharp point 14. Adjacent the point 14 a relatively narrow inwardly curved blade 15 is welded or otherwise integrally secured and extends upwardly and rearwardly in an inwardly directed curve. The rearward portion 16 of the frame 12 is built up. Secured to the inner face of the portion 16 is another shaped and curved blade 17 which lies in the same vertical plane as blade 15, but spaced therefrom. The frame 12 and blades 15 and 17 are adapted to receive, or to be attached to, the extreme end of a sickle bar in the conventional grooves and shapes 18 and 19. The conventional hole 20 and stud 21 are provided for attachment of a grass board. While there is only one preferred embodiment shown, it will be understood that any other outer shoe attachments may be substituted and that the precise design may be altered as long as the space or open eye between the blades 15 and 17 is retained.

Discussing the drawings in more detail, it will be seen that the outer shoe sole 11 is an elongated heavy plate which narrows at the front end thereof. The extreme forward portion is turned upwardly and slightly back on itself to form hook 22. The extreme rearward portion 23 of sole 11 is bent slightly upward. Since it is the sole 11 which rides on the ground, the trailing end 23 is formed as a skid. Also because of the wear, the sole 11 is removable. The hook 22 at the front end fits into and is retained by a hole 24 in the frame 12. An L-shaped fitting 25 is used to attach the sole 11 to the rear face of the built up portion 16. The vertical leg 26 of the L-shaped fitting is provided with spaced holes 27 to make vertical attaching adjustments. Depending upon how high it is desired to have the sickle bar set from the ground, the sole is attached to the frame 12 by means of a screw 28 and a lock washer spacer 30.

The central portion of frame 12 is wider and in the conventional form is adapted for attachment to a standard mower sickle bar. Specifically, the flat recessed channel 18 extending across the width of frame 12 is designed to accommodate the stationary end of the sickle bar, with squared apertures 31 and 32 providing suitable openings for bolts or other connecting means. Ahead of channel 18 is a contoured depression 19 and raised table 29. These are adapted to receive and guide in the conventional manner, the mower teeth and cutter assembly.

The curved vertical guide blade as before indicated, comprises a relatively narrow blade 15 and a rearward portion 17 separated by the opening. The portion 15 extends rearwardly and upwardly in an inward curve from point 14 of the frame 12 to which it is secured. The rearward portion 17 is integrally fastened to the built up part 16 of the frame. As clearly shown in FIGURE 2, front blade 15 and the upper front portion and entire rear portion of rear blade 17 are coplanar and curve inwardly in a vertical plane with respect to the sickle bar connection. As shown in FIGURES 2 and 3 in particular, the lower front portion of the rear blade 17 curves inwardly toward the horizontal plane of the frame 12, resulting in a compound curving face. The land 16 by which the blade 17 at its forward end is mounted on and secured to the frame, follows the compound curve on the opposite side of the blade to make a uniform and integrated attachment. The open area 33 between the blade portions 15 and 17 as seen in FIGURE 3, is large enough to provide room for connecting the frame 12 to the sickle bar. The open area 33 tapers upwardly and rearwardly to its narrowest width 34 which is sufficient for continuously relieving and pushing out any cuttings which may tend to accumulate in the area or eye 33.

In the operation of the sickle bar outer shoe 10, it is first attached to the outer end of a sickle bar in the appropriate conventional manner, which does not differ in any material manner with different types or models of mowing machines and rigs. In the correct mounted position, blade 15 curves inwardly toward the operator. The desired height of the sickle bar is adjusted at the outset by the attaching adjustment of the L-shaped bracket 25 and the selection of the appropriate hole 27. As the sickle bar is moved along the ground in the mowing position, the point 14 separates the cutting portion of the crop from the standing portion which remains on that particular pass. The blade 15 tends to guide the stalks into the path of the sickle bar, and after cutting, the cuttings are further guided away from the margin of the row being cut by the cooperation of blades 15 and 17. Cuttings and other matter will always tend to collect and accumulate in the open area or eye 33 above the sickle bar connection; but instead of bunching and remaining entrapped there, the forward movement of the mower and the ever presenting of new cuttings, sweeps them upwardly along the channel 34 where they are released into the path of other cuttings being guided and directed by the blades 15 and 17. The constant cleaning and elimination of cuttings from the eye 33 during the mowing, eliminates any requirement for the driver to stop periodically to clear the accumulations from the eye 33.

I claim:

1. In a sickle bar outer shoe, the combination of a relatively flat formed frame with a conventional sickle bar seat at its mid section and upstanding land immediately to the rear thereof, a narrow blade of substantially uniform width mounted integrally at one end to the front portion of said frame ahead of said sickle bar seat, the juncture of said blade and frame forming the forward point of the shoe and said front blade extending upwardly and rearwardly therefrom, and a rear blade having its front portion mounted integrally with said land and its lower front portion flared inwardly toward the horizontal, said front blade and the upper portion of the rear blade being in the same inwardly curving vertical plane as taken from the point of attachment of the front blade and said blades being spaced from each other leaving a rearwardly directed opening therebetween.

2. In a sickle bar outer shoe, the combination of a relatively flat formed frame with a conventional sickle bar seat at its mid section and an upstanding land immediately to the rear and outer side thereof, a narrow front blade of substantially uniform width mounted integrally at one end to the front portion of said frame ahead of said sickle bar seat, the juncture of said blade and said frame forming the forward point of the shoe and said front blade extending upwardly and rearwardly in an inwardly directed curve leaving a free end, and a rear blade having its front portion mounted integrally with said land and its lower front portion flared inwardly toward the horizontal, said front blade and the upper portion of the rear blade being in the same inwardly curving vertical plane as taken from the point of attachment of the front blade and said blades being spaced from each other leaving an opening therebetween which narrows rearwardly to an outlet channel adjacent the free end of the front blade.

3. In a sickle bar outer shoe, the combination of a relatively flat formed frame with a conventional sickle bar seat at its mid section and an upstanding land immediately to the rear and outer side thereof, a narrow front blade of substantially uniform width mounted integrally at one end to the front portion of said frame ahead of said sickle bar seat, the juncture of said blade and said frame forming the forward point of the shoe and said front blade extending upwardly and rearwardly in an inwardly directed curve leaving a free end, and a rear blade having its front portion mounted integrally with said land and its lower front portion flared inwardly toward the horizontal, said front blade and the upper portion of the rear blade being in the same inwardly curving vertical plane as taken from the point of attachment of the front blade and said blades being spaced from each other leaving an opening therebetween with the maximum space above the sickle bar seat and which narrows rearwardly to an outlet channel adjacent the free end of the front blade.

References Cited by the Examiner

UNITED STATES PATENTS

| | | | |
|---|---|---|---|
| 3,043,081 | 7/62 | Sandall | 56—314 |
| 3,046,723 | 7/62 | Young et al. | 56—314 |

ABRAHAM G. STONE, *Primary Examiner.*

RUSSELL R. KINSEY, T. GRAHAM CRAVER,
*Examiners.*